(12) United States Patent
Khitrenovich et al.

(10) Patent No.: US 8,683,568 B1
(45) Date of Patent: Mar. 25, 2014

(54) USING PACKET INTERCEPTION TO INTEGRATE RISK-BASED USER AUTHENTICATION INTO ONLINE SERVICES

(75) Inventors: Anton Khitrenovich, Kfar-Yona (IL); Oded Peer, Raanana (IL); Oleg Freylafert, Hod Hasharon (IL)

(73) Assignee: EMC Corporation, Hopkinton, MA (US)

( * ) Notice: Subject to any disclaimer, the term of this patent is extended or adjusted under 35 U.S.C. 154(b) by 53 days.

(21) Appl. No.: 13/239,863

(22) Filed: Sep. 22, 2011

(51) Int. Cl.
*H04L 29/06* (2006.01)

(52) U.S. Cl.
USPC ............. 726/7; 726/1; 726/2; 726/3; 726/22; 726/26; 726/28; 726/30; 713/151; 713/152; 713/160; 713/161; 713/170

(58) Field of Classification Search
USPC ................... 726/7, 13, 26; 713/151–152, 154
See application file for complete search history.

(56) References Cited

U.S. PATENT DOCUMENTS

| | | | |
|---|---|---|---|
| 8,095,649 B2 * | 1/2012 | Malloy et al. | 709/224 |
| 8,261,326 B2 | 9/2012 | Ben-Natan | |
| 2006/0155865 A1 * | 7/2006 | Brandt et al. | 709/230 |
| 2007/0220604 A1 * | 9/2007 | Long | 726/22 |
| 2008/0002595 A1 * | 1/2008 | Rao | 370/252 |
| 2008/0281961 A1 * | 11/2008 | Niemczyk et al. | 709/224 |
| 2010/0027430 A1 * | 2/2010 | Moore et al. | 370/252 |
| 2010/0046391 A1 * | 2/2010 | Moore et al. | 370/252 |
| 2010/0228650 A1 * | 9/2010 | Shacham et al. | 705/34 |
| 2010/0287416 A1 * | 11/2010 | Shacham et al. | 714/39 |
| 2013/0067073 A1 * | 3/2013 | Niemczyk et al. | 709/224 |

* cited by examiner

*Primary Examiner* — Luu Pham
*Assistant Examiner* — Jenise Jackson
(74) *Attorney, Agent, or Firm* — BainwoodHuang

(57) ABSTRACT

Techniques for using a network analyzer device connected to a network include (a) sniffing packets traversing the network between a web-based application server and a user machine, the user machine being operated by a user, (b) analyzing the sniffed packets to extract event information relating to interaction events between the user machine and the web-based application server, and (c) sending the extracted event information to an authentication server for risk-based authentication of the user.

22 Claims, 5 Drawing Sheets

USING PACKET INTERCEPTION TO INTEGRATE RISK-BASED USER AUTHENTICATION INTO ONLINE SERVICES

BACKGROUND

Banks and other secure transaction providers are wary to provide online banking applications to customer without ensuring that these applications are secure and that a mechanism is in place to properly authenticate users. In some systems, encrypted sessions are used between the user and bank, and the user is required to enter a secret password in order to gain access.

In one conventional approach, as an online banking application interacts with the user, the online banking application sends usage data to an external authentication server which is able to perform an analysis of usage patterns to authenticate the identity of the user as the proper customer.

SUMMARY

However, the above-described conventional approach suffers from deficiencies. In particular, in the conventional authentication approach, the online banking application must be modified to gather and send the usage pattern data to the authentication server. However, if the online banking application is already deployed prior to the addition of the authentication feature, adding in the usage detection and reporting features can be cumbersome and slow, particularly since all changes must be extensively tested to ensure that the security of the system remains intact. Furthermore, since the usage detection and reporting features are run by the online banking application itself, certain details (such as network-specific details) are not accessible to be reported to the authentication server.

In contrast to the above-described approaches, the present disclosure describes techniques for adding risk-based authentication to a pre-existing web-based application without the need to modify the application. Furthermore, these techniques also allow the authentication server to consider additional details in performing the authentication. In particular, the risk-based authentication system may be expeditiously integrated into the system without significant modifications to the system by configuring a device to sniff packets on the local network of the banking application website, analyze those packets to generate event information, and send the event information to the authentication server.

A method is described, using a network analyzer device connected to a network. The method includes sniffing packets traversing the network between a web-based application server and a user machine, the user machine being operated by a user, analyzing the sniffed packets to extract event information relating to interaction events between the user machine and the web-based application server, and sending the extracted event information to an authentication server for risk-based authentication of the user. Corresponding system, apparatus, and computer program products are also described.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Techniques are described herein for using a network analyzer device connected to a local network to sniff packets traversing the network, analyze those packets to generate event information, and send the event information to an authentication server.

Figure 1:
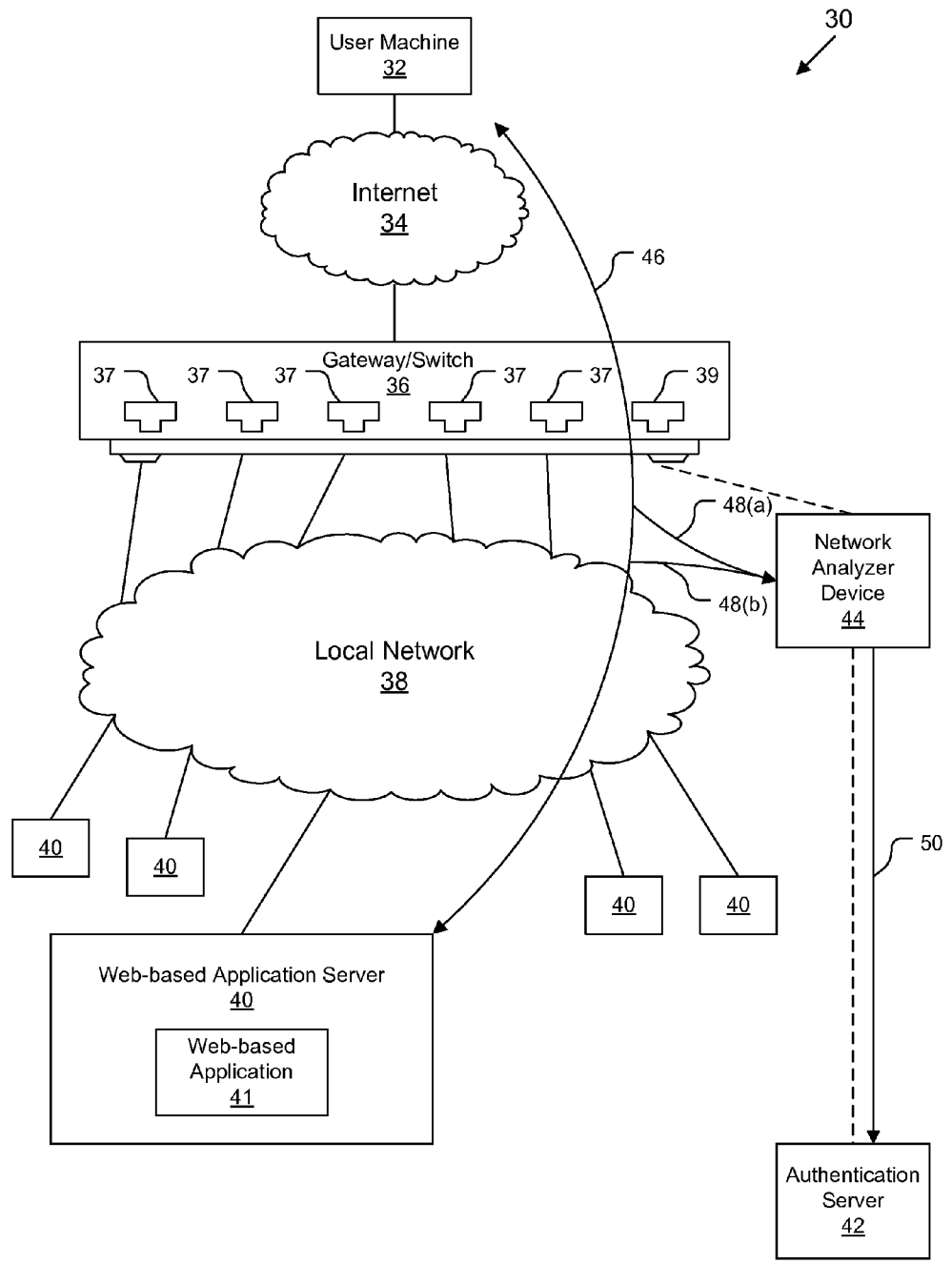
FIG. 1 illustrates an example system for use in practicing various embodiments.

FIG. 1 illustrates an example system 30 for use in practicing various embodiments. System 30 includes a user machine 32 communicatively coupled to the Internet 34. User machine may be a computer, a smart phone, or any other electronic device capable of communicating over a computer network. User machine typically is capable of displaying web pages or having similar functionality. Although Internet 34 is depicted, in some embodiments, any kind of computer network may take its place.

A gateway/switch 36 is also communicatively coupled to the Internet 34. Gateway/switch 36 may be a gateway between Internet 34 and a local network 38 to allow devices on the local network 38 to communicate with devices on the Internet 34. Gateway/switch 36 may connect to local network 38 via network ports 37. Gateway/switch 36 may also contain a special network port 39, as will be described in further detail below. Web-based application servers 40 connect to local network 38. Gateway/switch 36 may also function to balance loads between the web-based application servers 40. Web-based application server 40 runs a web-based application 41, which is accessible by user machine 32 across the Internet. In typical operation, a user runs a web browser on user machine 32 to remotely access the web-based application 41. In one embodiment, web-based application 41 is a secure application for conducting secure transactions across potentially remote distances, such as, for example, an on-line banking application, such as is well-known in the art.

Also connected to gateway/switch 36, either directly, or via local network 38, is a network analyzer device (NAD) 44. It should be understood that, although NAD 44 is depicted as separate from gateway/switch 36, in some embodiments, the functions of NAD 44 may be integrated within gateway/switch 36. In some embodiments, NAD 44 connects to gateway/switch 36 via a network port 37. In other embodiments, NAD 44 connects to gateway/switch 36 via special network port 39 configured to mirror all traffic 46 passing through gateway/switch 36. NAD 44 is configured to at least receive incoming network traffic 48(a) from user machine 32 (aimed at web-based application server 40) as well as outgoing network traffic 48(b) from web-based application server 40 (aimed at user machine 32). As will be explained below in further detail, NAD 44 sniffs packets traversing the gateway/switch between the user machine and web-based application server 40, analyzes them to extract various information, and sends messages 50 containing the extracted information to a risk-based authentication server 42, which is configured to analyze the extracted information in order to authenticate the identity of a user accessing the web-based application 41 by performing risk-based authentication, such as, for example, by monitoring for risky transactions or other behavior indicative of session hijacking, fraud, or system misuse. Authentication server 42 may utilize any form of risk-based authentication, such as, for example, risk-based adaptive authentication, as is well-known in the art.

In one embodiment, web-based application 41 may be a pre-existing application in which risk-based authentication functionality is not already present. NAD 44 can then be inserted into the local network 38 and programmed to execute methods described herein to add the risk-based authentication feature without any need to significantly modify the web-based application 41 to support the risk-based authentication. In some instances, NAD 44 may already be present within local network 38 but not yet configured to perform as described herein (e.g., NAD 44 may have previously been present and configured to perform network security monitoring functions).

Figure 2:
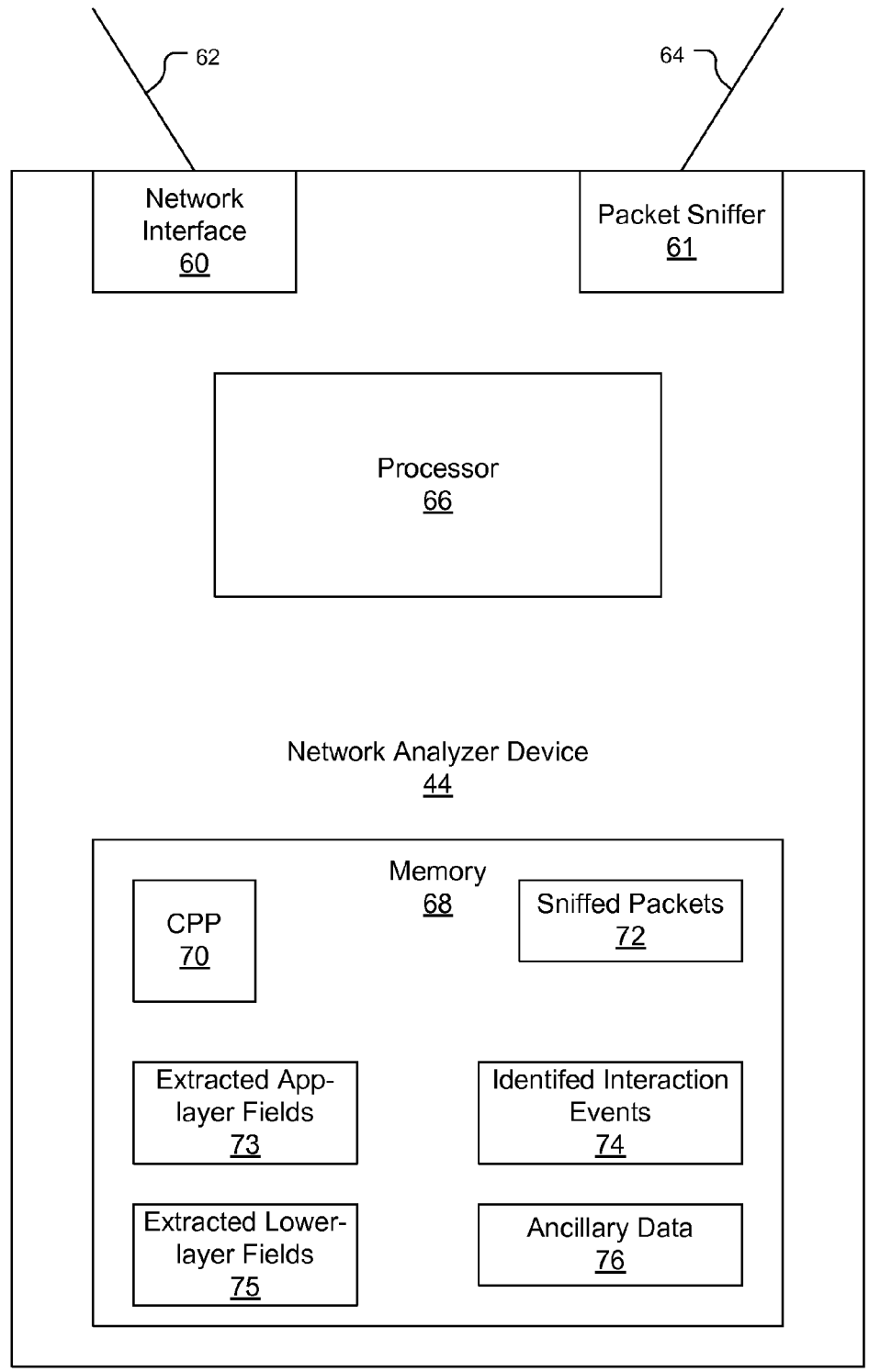
FIG. 2 illustrates an example apparatus according to various embodiments.

FIG. 2 depicts an example NAD 44 in further detail. NAD 44 includes a network interface 60 configured to connect, over connection 62, to risk-based authentication server 42. NAD 44 also includes means for packet sniffing. In some embodiments, as depicted, means for packet sniffing include a packet sniffer 61 configured to connect to gateway/switch 36 over dedicated connection 64, such as a network connection or a serial bus connection. Dedicated connection 64 may connect to a mirroring port of gateway/switch 36, such as, for example, special network port 39. Packet sniffer 61 may also include logic configured to examine and sort the contents of mirrored packets received from connection 64. In other embodiments, not depicted, means for packet sniffing may include hardware logic and/or software code configured to examine and sort the contents of packets received at network interface 60 over network connection 62. In embodiments in which the functions of NAD 44 are integrated within gateway/switch 36, means for packet sniffing may include logic configured to examine and sort the contents of all packets passing through gateway/switch 36.

NAD 44 also includes a processor 66 and memory 68. Processor 66 may be, for example, a central processing unit, a microprocessor, a digital signal processor, a field-programmable gate array, a collection of circuits configured to perform various operations, or another similar device or set of devices configured to perform operations. Memory 68 may include, for example, system memory, cache memory, volatile memory, non-volatile memory, random access memory, read-only memory, non-volatile storage, magnetic storage, optical storage, some combination thereof, or another similar device or set of devices configured to store application programs and or application data.

Memory 68 includes a computer program product. The computer program product stores a computer program (CP) 70 within a tangible non-transitory computer-readable storage medium. CP 70, when executed by processor 66, is configured to cause the processor 66 to perform a method (see FIG. 5, below) according to one embodiment. In some embodiments, for example, when processor 66 is implemented as a collection of circuits configured to perform various operations, CP 70 may be functionally implemented within the collection of circuits in addition to or in lieu of being stored within memory 68. In any event, within this document, whenever CP 70, or any piece or portion of software within NAD 44, is described as performing a method or operation, that method or operation is actually performed by the processor 66 while executing instructions of CP 70 or the piece or portion of software within NAD 44.

Memory 68 also stores a set of sniffed packets 72, a set of extracted application-layer fields 73, a set of identified interaction events 74, a set of extracted lower-layer fields 75, and a set of ancillary data 76. Further detail with respect to memory contents 72-76 will be provided below, in connection with FIG. 4. Memory 68 may also store additional items typically stored within memory, such as, for example, an operating system executed by processor 66, additional application programs, additional application data, and user data (not depicted).

Figure 3:
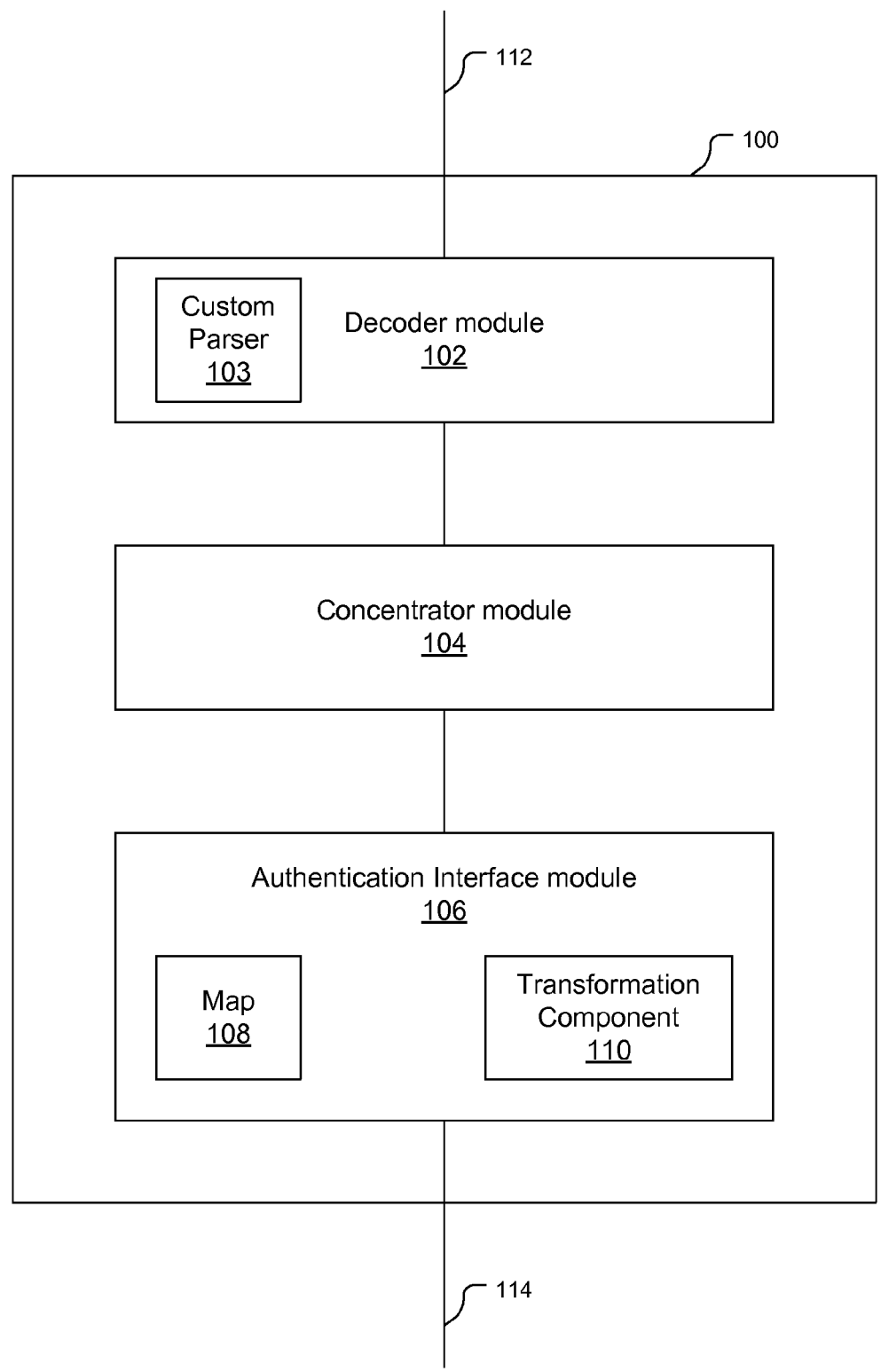
FIG. 3 illustrates an example logical arrangement in accordance with various embodiments.

FIG. 3 depicts an example logical arrangement 100 of CPP 70. Logical arrangement 100 includes a decoder module 102, a concentrator module 104, and an authentication interface module 106. Decoder module 102 interfaces over logical connection 112 with packet sniffer 61 (or packet sniffing means), while authentication interface module 106 interfaces over logical connection 114 with network interface 60 to communicate with risk-based authentication server 42. It should be understood that, although only one NAD 44 is depicted and although modules 102, 104, and 106 are depicted together within logical arrangement 100, modules 102, 104, and 106 may each execute on separate machines.

Decoder module 102 is configured to parse sniffed packets 72 received via logical connection 112 and to search for patterns and/or extract certain kinds of data. In some embodiments, custom parser 103 may be implemented as part of decoder module 102. In some arrangements, multiple machines may be configured to perform packet sniffing of various local networks 38, each machine running a separate instance of decoder module 102.

Concentrator module 104 aggregates and organizes the data extracted by decoder module 102 and periodically sends it to the authentication interface module 106. In arrangements having multiple decoder modules 102, concentrator module 104 arranges the data extracted by each decoder module 102 into an aggregated and organized collection.

Authentication interface module 106 periodically receives data from the concentrator module 104, analyzes it, and sends communications 50 to authentication server 42 via connection 114. The period of receipt may be, for example, one minute. In some embodiments, authentication interface module 106 pulls the data from the concentrator module 104 by periodically polling for new data. In other embodiments concentrator module 104 pushes newly-received data (either periodically or as it is received) to authentication interface module 106. Transformation component 110 examines the data and identifies interaction events of certain pre-selected types between the user and the web-based application 41, storing the identified events as the set of identified interaction events 74. This may be done in consultation with a user/session state map 108. In some embodiments, transformation component 110 also identifies certain ancillary data 76 that relates to the identified events. Further detail of these identifications will be provided below, in connection with FIG. 4. Authentication interface module 106 eventually packages the events 74 and ancillary data 76 into messages using a structured information exchange protocol (e.g., SOAP) understandable by the risk-based authentication server 42 so that the risk-based authentication server 42 can process that information for risk-based user authentication purposes.

Figure 4:
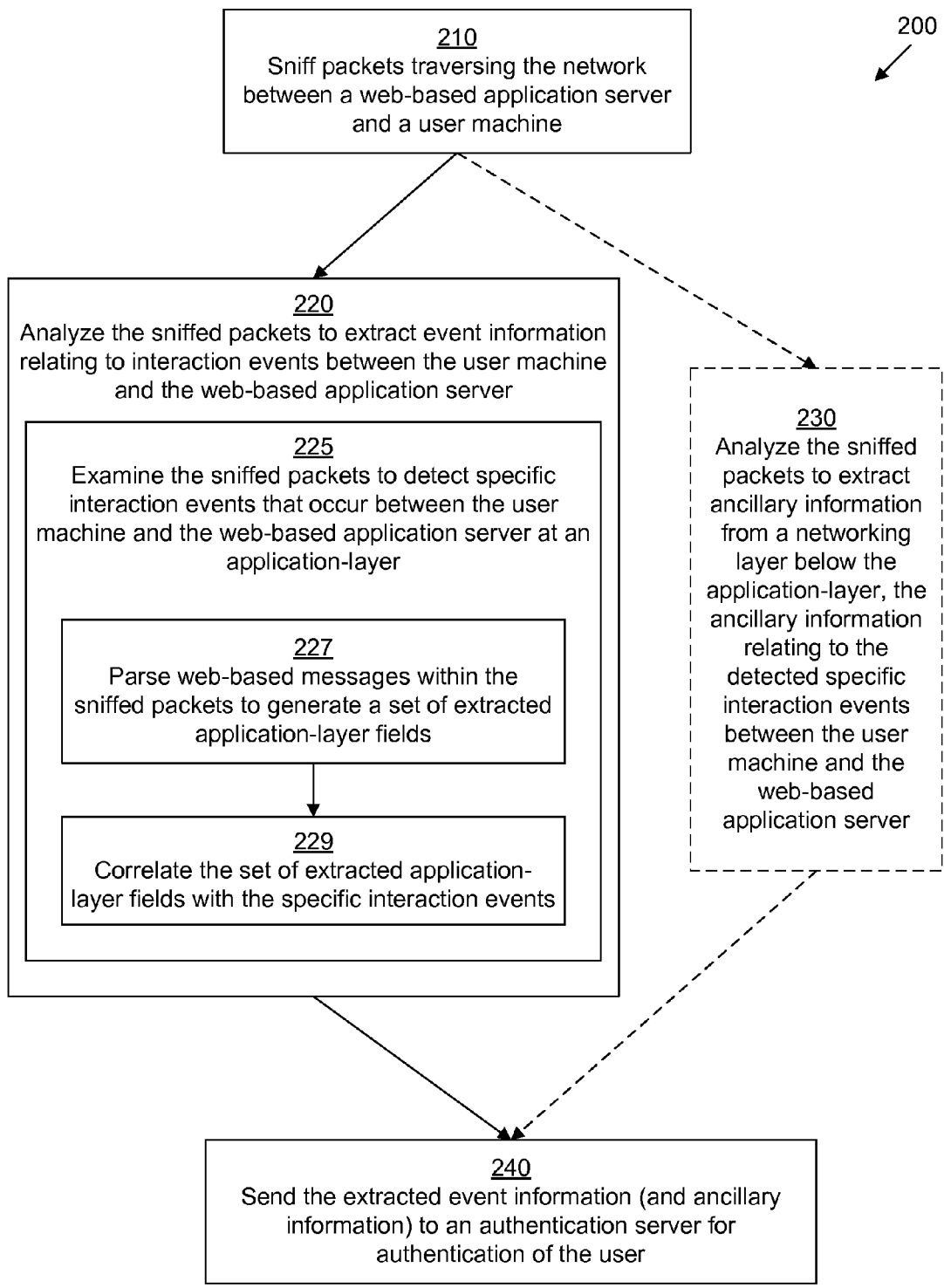
FIG. 4 illustrates an example method according to various embodiments.

FIG. 4 depicts a method 200 performed by NAD 44. In step 210, packet sniffer 61 (or other packet sniffing means) sniffs packets traversing the local network 38 between the web-based application server 40 and the user machine 32. In some embodiments all packets traversing the network are received by packet sniffer 61, and packet sniffer 61 disregards any packet whose network-layer source address (e.g., in an IP-based network, the source IP address within an IP packet) or network-layer destination address (e.g., in an IP-based network, the destination IP address within an IP packet) is not the network-layer address of the web-based application server 40. In other embodiments, gateway/switch 36 only sends packets having the network-layer address of the web-based application server 40 within their source or destination fields to the packet sniffer 61. In some embodiments, packet sniffer 61 further analyzes the incoming packets to determine whether or not they originated at or were destined for the web-based application 41, discarding packets having no relation to the web-based application 41. Packet sniffer 61 may store all non-excluded/non-discarded packets as sniffed packets 72 within memory 68.

In step 220, NAD 44 analyzes the sniffed packets 72 to extract event information relating to interaction events between the user machine 32 and the web-based application server 40, particularly the web-based application 41. Step 225 provides further detail of an example implementation of step 220.

In step 225, NAD 44 examines the sniffed packets 72 in order to detect specific interaction events that occur between the user machine 32 and the web-based application server 40 at the application layer. These specific interaction events at the application layer reflect specific actions performed by the user at the web-based application 41 from the perspective of the web-based application 41. For example, if the web-based application 41 is a secure application for conducting secure transactions across potentially remote distances, then the specific interactions might include (a) the user logging in to the web-based application 41; (b) the user changing a login password; and (c) the user changing his user e-mail address. As a more specific example, if the web-based application 41 is an on-line banking application, then the specific interactions might additionally include (d) the user directing the on-line banking application to make a monetary transfer between the user's account and another specified account; (e) the user adding an approved destination account for transfers; (f) the user modifying information associated with an approved destination account; and (g) the user changing his customer mailing address.

Figure 5:
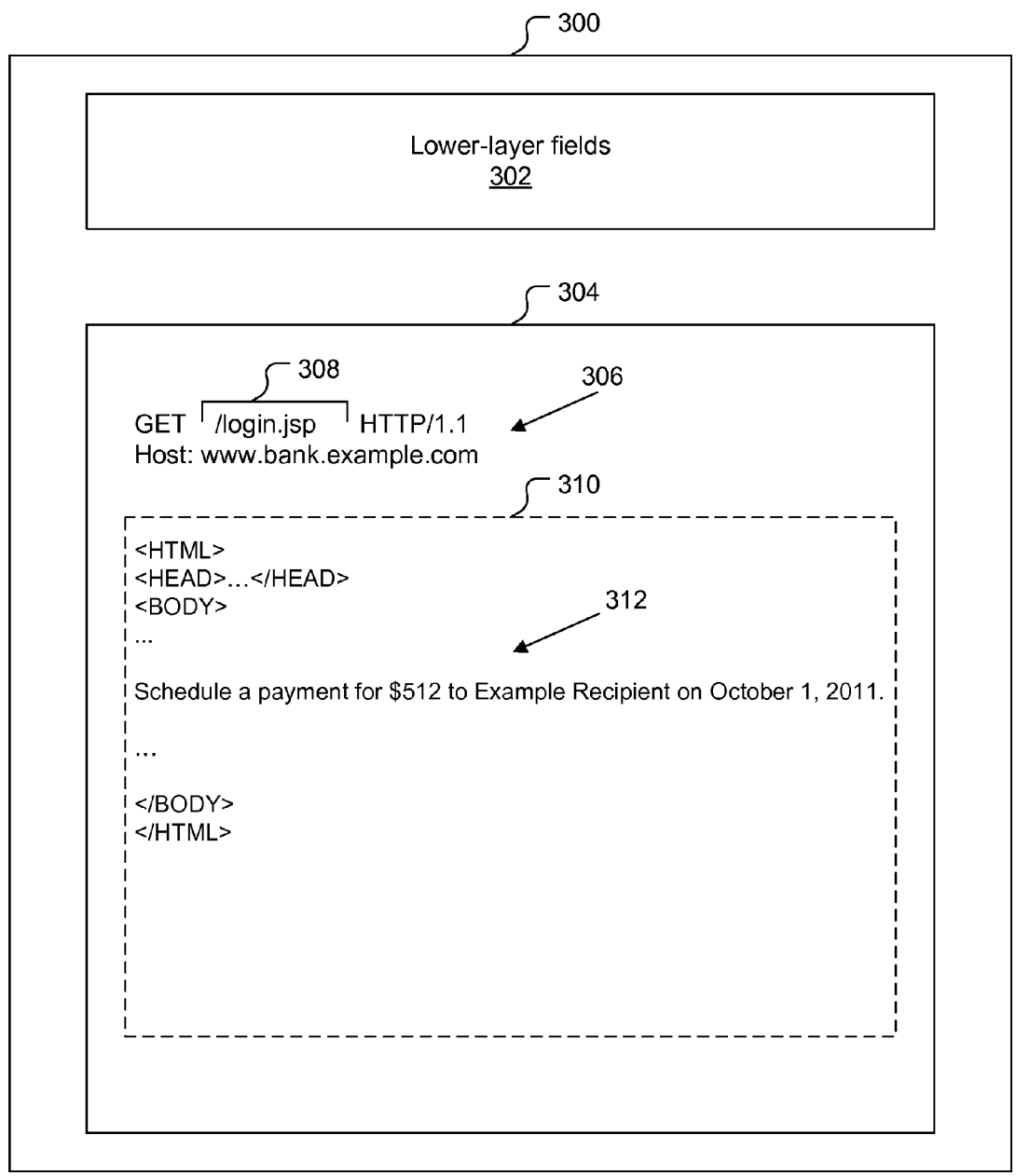
FIG. 5 illustrates an example packet for use in practicing various embodiments.

Step 225 may be broken down into sub-steps which may be performed by different modules. FIG. 5 is of relevance at this point. It depicts an example sniffed packet 300. Sniffed packet 300 includes various lower-layer fields 302 (i.e., networking fields that are of a lower order than the application layer—thus, in the OSI model, since the application layer is layer 7, example lower-layers would include the network layer 3 as well as transport layer 4 and session layer 5) as well as an application layer (i.e., OSI layer 7) message, such as a web-based (e.g., HTTP) message 304.

Returning to the sub-steps within step 225 of FIG. 4, in sub-step 227, decoder module 102 parses web-based message 304 within each sniffed packet 300 to generate a set of extracted application-layer fields 73. A custom parser 103 (see FIG. 3) may be implemented within decoder module 102 for this purpose, designed to look for specific patterns. For example, one pattern that the custom parser 103 may be configured to search for would be a reference to a specific page (e.g., "/login.jsp") 308 within an HTTP header 306. It should be understood that several different specific pages may be searched for by the parser. As another example, if the HTTP message 304 includes a web page 310, there may be a pattern embedded within the page that indicates an event of relevance. Thus, custom parser 103 may be configured to look for a pattern of the form "Schedule a payment for \$[0-9]+.[0-9][0-9] to [a-z||A-Z]+ on [0|1]?[0-9][-|/][0-3]?[0-9][-|/]2[0-9][0-9][0-9]." where \$[0-9]+.[0-9][0-9] represents a dollar amount, [a-z||A-Z]+ represents a name of an example recipient, and [0|1]?[0-9][-|/][0-3]?[0-9][-|/]2[0-9][0-9][0-9] represents a date in MM-DD-YYYY or MM/DD/YYYY format using regular expression parsing, the presence of such a pattern indicating that the user (or, possibly, a malicious entity masquerading as the user) is attempting to make a payment.

Once several sniffed packets 72 have been thus parsed, the set of extracted application-layer fields 73 may contain several different fields returned by the parser 103. In some embodiments, the fields coming from identical TCP sessions may be grouped together, so that related fields are listed in proximity.

In sub-step 229, authentication interface module 106 correlates the set of extracted application-layer fields 73 with specific interaction events. A transformation component 110 may be implemented within authentication module 106 for this purpose, designed to analyze the set of extracted application-layer fields 73 and extract underlying event information relating to specific actions performed by the user at the web-based application 41, storing the results as the set of identified interaction events 74. Transformation component 110 processes elements of the set of extracted application-layer fields 73 having a TCP session in common and grouped into a set of HTTP request-response pairs, which are of use in identifying specific interaction events. For example, if transformation component 110 detects a user HTTP POST request for a page called do_payment.jsp having data embedded therewithin (including, for example, a recipient, a date, and a dollar amount), followed by an HTTP response from the web-based application 41 containing the phrase "Payment has been processed," then transformation component 110 is able to correlate those events with a monetary transfer event (d), storing an indication of that event and the relevant embedded data within a specific event of the set of identified specific events 74. In some embodiments, user/session state map 108 is used by the transformation component 106 to ascertain what events are possibly expected within the context of a particular user.

Optional step 230 may be performed in parallel with step 220. In optional step 230, NAD 44 analyzes the sniffed packets 72 to extract ancillary information relating to interaction events between the user machine 32 and the web-based application server 40, particularly the web-based application 41. The ancillary information is drawn from a networking layer below the application layer and relates to specific detected events. For example, the ancillary information may be drawn from lower-layer fields 302 in the network layer (layer 3), the transport layer (layer 4), or the session layer (layer 5) of a sniffed packet 300. Examples of ancillary information that may be drawn from lower-layer fields 302 might include (1) packet size; (2) clock skew between packets; (3) number of simultaneous sessions operated by the user; (4) browser type used by the user; (5) operating system type used by the user; and (6) time interval between service of a web-page by the web-based application server 40 and response by the user machine 32.

In one embodiment, custom parser 103 of decoder module 102 extracts the lower-layer fields 302 from the packet and stores them as the set of extracted lower-layer fields 75. Then, transformation component 110 associates the set of extracted lower-layer fields 75 with particular events of the set of extracted interaction events in order to create the set of ancillary data 76.

Periodically, after performing step 220 and optional step 230, authentication interface module 106 performs step 240 to send the extracted event information (and ancillary information) to the risk-based authentication server 42 for risk-based authentication of the user. Authentication interface module 106 places the data from the set of identified interaction events 74 (and the data from the set of ancillary data 76) into a format understood by the risk-based authentication server 42 using a structured information exchange protocol, for example, using the well-known SOAP protocol, and sends protocol packets to the risk-based authentication server 42 over logical connection 114 and on to network interface 60 to be sent over connection 62 to the risk-based authentication server.

Thus, techniques have been described for expeditiously adding a risk-based authentication feature to a secure web-based application 41 by performing packet sniffing on the local network 38 of the web-based application 41, analyzing the sniffed packets 72 to detect specific application-layer interaction events, and sending communications to the authentication server 42 in order to communicate those events for risk-based authentication purposes. Techniques have also been described for sending ancillary information from lower layers of the sniffed packets 72 for enhanced risk-based authentication.

While various embodiments of the invention have been particularly shown and described, it will be understood by those skilled in the art that various changes in form and details may be made therein without departing from the spirit and scope of the invention as defined by the appended claims.

It should be understood that although various embodiments have been described as being methods, software embodying these methods is also included. Thus, one embodiment includes a tangible non-transitory computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded.

Finally, nothing in this Specification shall be construed as an admission of any sort. Even if a technique, method, apparatus, or other concept is specifically labeled as "prior art" or as "conventional," Applicants make no admission that such technique, method, apparatus, or other concept is actually prior art under 35 U.S.C. §102, such determination being a legal determination that depends upon many factors, not all of which are known to Applicants at this time.

What is claimed is:

1. A method, performed by a network analyzer device connected to a network, the method comprising:
   sniffing packets traversing the network between a web-based application server and a user machine, the user machine being operated by a user;
   analyzing the sniffed packets to extract event information relating to interaction events between the user machine and the web-based application server; and
   sending the extracted event information to an authentication server for risk-based authentication of the user;
   wherein:
   analyzing the sniffed packets to extract event information relating to interaction events between the user machine and the web-based application server includes examining the sniffed packets to detect specific interaction events that occur between the user machine and the web-based application server at an application layer;
   the specific interaction events include events drawn from a set of application-layer events;
   the authentication server is configured to perform risk-based authentication of the user by analyzing the specific interaction events drawn from the set of application-layer events; and
   the web-based application server provides a secure online banking service to the user as the web-based application.

2. The method of claim 1 wherein sniffing packets traversing the network between the web-based application server and the user machine includes capturing packets traversing the network having either a source or destination network-layer address corresponding to a network-layer address of the web-based application server.

3. The method of claim 1 wherein examining the sniffed packets to detect the specific interaction events that occur between the user machine and the web-based application server at the application-layer includes:
   parsing web-based messages within the sniffed packets to generate a set of extracted application-layer fields; and
   correlating the set of extracted application-layer fields with the specific interaction events.

4. The method of claim 1 wherein the set of application-layer events including: the user logging in to the web-based application server;
   the user changing a login password; and the user changing a user e-mail address.

5. The method of claim 4 wherein the set of application-layer events further includes:
   the user directing the secure online banking service to make a monetary transfer;
   the user adding an approved destination account for transfers;
   the user modifying information associated with an approved destination account; and
   the user changing a customer mailing address.

6. The method of claim 4 wherein the method further comprises:
   analyzing the sniffed packets to extract ancillary information from a networking layer below the application-layer, the ancillary information relating to the detected specific interaction events between the user machine and the web-based application server; and
   sending the extracted ancillary information to the authentication server for risk-based authentication of the user in connection with the extracted event information.

7. A method, performed by a network analyzer device connected to a network, the method comprising:
   sniffing packets traversing the network between a web-based application server and a user machine, the user machine being operated by a user;
   analyzing the sniffed packets to extract event information relating to interaction events between the user machine and the web-based application server; and
   sending the extracted event information to an authentication server for risk-based authentication of the user;
   wherein:
   analyzing the sniffed packets to extract event information relating to interaction events between the user machine and the web-based application server includes examining the sniffed packets to detect specific interaction events that occur between the user machine and the web-based application server at an application layer;
the specific interaction events include events drawn from a set of application-layer events including:
the user logging in to the web-based application server;
the user changing a login password; and
the user changing a user e-mail address; and
the authentication server is configured to perform risk-based authentication of the user by analyzing the specific interaction events drawn from the set of application-layer events;
the method further comprises:
analyzing the sniffed packets to extract ancillary information from a networking layer below the application-layer, the ancillary information relating to the detected specific interaction events between the user machine and the web-based application server; and
sending the extracted ancillary information to the authentication server for risk-based authentication of the user in connection with the extracted event information; and
analyzing the sniffed packets to extract ancillary information from the networking layer below the application-layer includes detecting specific ancillary information from the networking layer below the application-layer drawn from a set of data including:
packet size;
clock skew between packets;
number of simultaneous sessions operated by the user;
browser type used by the user;
operating system type used by the user; and
time interval between service of a web-page by the web-based application server and response by the user machine.

8. A method of adding a risk-based user authentication capability to a pre-existing web-based application service running on the web-based application server, the method comprising installing a network analyzer device configured to perform the method of claim 1, without making a non-trivial modification to the pre-existing web-based application service running on the web-based application server to support risk-based user authentication.

9. A computer program product comprising a non-transitory tangible computer-readable storage medium, the tangible computer-readable storage medium storing instructions, which, when performed by a computing device, cause the computing device to perform the operations of:
sniffing packets traversing a network between a web-based application server and a user machine, the user machine being operated by a user;
analyzing the sniffed packets to extract event information relating to interaction events between the user machine and the web-based application server; and
sending the extracted event information to an authentication server for risk-based authentication of the user;
wherein:
the instructions direct the computer to, when analyzing the sniffed packets to extract event information relating to interaction events between the user machine and the web-based application server, examine the sniffed packets to detect specific interaction events that occur between the user machine and the web-based application server at an application-layer, wherein the specific interaction events include events drawn from a set of application-layer events;

the authentication server is configured to perform risk-based authentication of the user by analyzing the specific interaction events drawn from the set of application-layer events; and
the web-based application server provides a secure online banking service to the user as the web-based application.

10. The computer program product of claim 9 wherein, the instructions direct the computer to, when sniffing packets traversing the network between the web-based application server and the user machine, capture packets traversing the network having either a source or destination network-layer address corresponding to a network-layer address of the web-based application server.

11. The computer program product of claim 9 wherein the instructions direct the computer to, when analyzing the sniffed packets to extract event information relating to interaction events between the user machine and the web-based application server:
examine the sniffed packets to detect specific interaction events that occur between the user machine and the web-based application server at an application-layer, wherein examining the sniffed packets to detect the specific interaction events that occur between the user machine and the web-based application server at the application-layer includes:
parsing web-based messages within the sniffed packets to generate a set of extracted application-layer fields; and
correlating the set of extracted application-layer fields with the specific interaction events.

12. The computer program product of claim 9 wherein the set of application-layer events includes:
the user logging in to the web-based application server;
the user changing a login password; and
the user changing a user e-mail address.

13. The computer program product of claim 12 wherein the instructions, when performed by the computer, further cause the computer to perform the operations of:
analyzing the sniffed packets to extract ancillary information from a networking layer below the application-layer, the ancillary information relating to the detected specific interaction events between the user machine and the web-based application server; and
sending the extracted ancillary information to the authentication server for risk-based authentication of the user in connection with the extracted event information.

14. A network analyzer device comprising:
a processor;
means for sniffing packets traversing a network; and
memory, the memory storing instructions, which, when performed by the processor, cause the processor to perform the operations of:
directing the packet sniffing means to sniff packets traversing the network between a web-based application server and a user machine, the user machine being operated by a user;
analyzing the sniffed packets to extract event information relating to interaction events between the user machine and the web-based application server; and
sending the extracted event information to an authentication server for risk-based authentication of the user;
wherein:
the instructions direct the processor to, when analyzing the sniffed packets to extract event information relating to interaction events between the user machine and the web-based application server, examine the sniffed packets to detect specific interaction events that occur between the user machine and the web-based application server at an application-layer, wherein the specific interaction events include events drawn from a set of application-layer events;
the authentication server is configured to perform risk-based authentication of the user by analyzing the specific interaction events drawn from the set of application-layer events; and
the web-based application server provides a secure online banking service to the user as the web-based application.

15. The network analyzer device of claim 14 wherein the instructions direct the processor to, when sniffing packets traversing the network between the web-based application server and the user machine, direct the packet sniffing means to capture packets traversing the network having either a source or destination network-layer address corresponding to a network-layer address of the web-based application server.

16. The network analyzer device of claim 14 wherein the set of application-layer events includes:
   the user logging in to the web-based application server;
   the user changing a login password; and
   the user changing a user e-mail address.

17. The network analyzer device of claim 16 wherein the instructions, when performed by the processor, further cause the processor to perform the operations of:
   analyzing the sniffed packets to extract ancillary information from a networking layer below the application-layer, the ancillary information relating to the detected specific interaction events between the user machine and the web-based application server; and
   sending the extracted ancillary information to the authentication server for risk-based authentication of the user in connection with the extracted event information.

18. A system comprising:
   a network gateway device, configured to connect a remote user machine to a network;
   a web-based application server, connected to the network, the web-based application server being configured to provide, across the network gateway device, a web-based application service to a user operating the user machine; and
   a network analyzer device, connected to the network gateway device, the network analyzer device configured to:
      sniff packets traversing the network gateway device between the web-based application server and the user machine;
      analyze the sniffed packets to extract event information relating to interaction events between the user machine and the web-based application server; and
      send the extracted event information to an authentication server for risk-based authentication of the user;
   wherein:
      analyzing the sniffed packets to extract event information relating to interaction events between the user machine and the web-based application server includes examining the sniffed packets to detect specific interaction events that occur between the user machine and the web-based application server at an application layer;
      the specific interaction events include events drawn from a set of application-layer events;
      the authentication server is configured to perform risk-based authentication of the user by analyzing the specific interaction events drawn from the set of application-layer events; and
      the web-based application server provides a secure online banking service to the user as the web-based application.

19. The computer program product of claim 13 wherein analyzing the sniffed packets to extract ancillary information from the networking layer below the application-layer includes detecting specific ancillary information from the networking layer below the application-layer drawn from a set of data including:
   packet size;
   clock skew between packets;
   number of simultaneous sessions operated by the user;
   browser type used by the user;
   operating system type used by the user; and
   time interval between service of a web-page by the web-based application server and response by the user machine.

20. The computer program product of claim 12 wherein the set of application-layer events further includes:
   the user directing the secure online banking service to make a monetary transfer;
   the user adding an approved destination account for transfers;
   the user modifying information associated with an approved destination account; and
   the user changing a customer mailing address.

21. The network analyzer device of claim 17 wherein analyzing the sniffed packets to extract ancillary information from the networking layer below the application-layer includes detecting specific ancillary information from the networking layer below the application-layer drawn from a set of data including:
   packet size;
   clock skew between packets;
   number of simultaneous sessions operated by the user;
   browser type used by the user;
   operating system type used by the user; and
   time interval between service of a web-page by the web-based application server and response by the user machine.

22. The network analyzer device of claim 16 wherein the set of application-layer events further includes:
   the user directing the secure online banking service to make a monetary transfer;
   the user adding an approved destination account for transfers;
   the user modifying information associated with an approved destination account; and
   the user changing a customer mailing address.

* * * * *